United States Patent
Wu et al.

(10) Patent No.: US 11,269,696 B2
(45) Date of Patent: Mar. 8, 2022

(54) APPLICATION PROCESSING METHOD AND APPARATUS

(71) Applicant: TENCENT TECHNOLOGY (SHENZHEN) COMPANY LIMITED, Shenzhen (CN)

(72) Inventors: Zongzhuo Wu, Shenzhen (CN); Haojun Hu, Shenzhen (CN); Hao Hu, Shenzhen (CN); Chao Lin, Shenzhen (CN); Shunhang You, Shenzhen (CN); Qingjie Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/027,623

(22) Filed: Sep. 21, 2020

(65) Prior Publication Data

US 2021/0004280 A1 Jan. 7, 2021

Related U.S. Application Data

(63) Continuation of application No. 16/280,498, filed on Feb. 20, 2019, now Pat. No. 10,831,567, and a (Continued)

(30) Foreign Application Priority Data

Oct. 18, 2016 (CN) .......................... 201610908829.0

(51) Int. Cl.
*G06F 9/44* (2018.01)
*G06F 9/54* (2006.01)
*G06F 9/445* (2018.01)

(52) U.S. Cl.
CPC .......... *G06F 9/542* (2013.01); *G06F 9/44505* (2013.01); *G06F 9/44526* (2013.01)

(58) Field of Classification Search
CPC ...................................................... G06F 9/542
(Continued)

(56) References Cited

U.S. PATENT DOCUMENTS

| 6,412,021 B1 * | 6/2002 | Nguyen | G06F 9/44526 709/217 |
| 2016/0357583 A1 * | 12/2016 | Decker | G06F 21/51 |
| 2018/0012013 A1 * | 1/2018 | Yura | H04W 12/104 |

FOREIGN PATENT DOCUMENTS

| CN | 1399737 A | 2/2003 |
| CN | 1722088 A | 1/2006 |

(Continued)

OTHER PUBLICATIONS

The World Intellectual Property Organization (WIPO) International Search Report for PCT/CN2017/105782 dated Jan. 16, 2018 6 Pages (including translation).

(Continued)

*Primary Examiner* — Timothy A Mudrick
(74) *Attorney, Agent, or Firm* — Anova Law Group, PLLC

(57) ABSTRACT

A application-program processing method is provided. The method includes obtaining a sub-application identifier by using a parent application running in an operating system, obtaining a corresponding sub-application page configuration file according to the sub-application identifier, and obtaining a common-component identifier from the sub-application page configuration file. The method also includes selecting a common-component corresponding to the common-component identifier from a common-component library provided by the parent application, and generating a sub-application page according to the selected common-component.

20 Claims, 5 Drawing Sheets

Related U.S. Application Data continuation of application No. PCT/CN2017/105782, filed on Oct. 12, 2017.

(58) Field of Classification Search
USPC .......................................................... 719/318
See application file for complete search history.

(56) References Cited

FOREIGN PATENT DOCUMENTS

| | | | |
|---|---|---|---|
| CN | 102663003 | A | 9/2012 |
| CN | 105487886 | A | 4/2016 |
| CN | 106250158 | A | 12/2016 |
| CN | 106502736 | A | 3/2017 |

OTHER PUBLICATIONS

The State Intellectual Property Office of the People's Republic of China (SIPO) Cffice Action 1 for 201610908829.0 dated Oct. 31, 2017 7 Pages.

\* cited by examiner

APPLICATION PROCESSING METHOD AND APPARATUS

RELATED APPLICATIONS

This application is a continuation application of U.S. patent application Ser. No. 16/280,498, filed on Feb. 20, 2019, which in turn is a continuation application of PCT Patent Application No. PCT/CN2017/105782, filed on Oct. 12, 2017, which in turn claims priority to Chinese Patent Application No. 201610908829.0, entitled "APPLICATION PROCESSING METHOD AND APPARATUS" and filed with the Chinese Patent Office on Oct. 18, 2016, all of which are incorporated by reference in its entirety.

FIELD OF TECHNOLOGY

The present disclosure relates to the field of computer technologies and, in particular, to an application-program processing method and apparatus.

BACKGROUND

An application program (or simply an application) is a code instruction sequence that may be executed by a terminal, such as a computer, that has an information processing capability to obtain a result, or may be a symbol instruction sequence or a symbol statement sequence that may be automatically converted to a code instruction sequence. Currently, a user may install various applications on a terminal, such as a photography application, a social application, or a mail application, so that various functions may be implemented by the applications installed on the terminal, such as a photography function, a social function, or an email management function.

However, currently, the user first needs to download an application installation package from a network, decompress the application installation package on the terminal, put decompressed various files into a specified installation directory, register the application in an operating system, and generate an icon of the application, so that the user may subsequently click the icon to start and use the application. Thus, the entire process may be complex and difficult for ordinary users.

The disclosed methods and systems are directed to solve one or more problems set forth above and other problems.

SUMMARY

Embodiments of this application provide an application-program processing method and apparatus and may improve use efficiency of an application.

One aspect of the embodiments of this application provides an application-program processing method. The method includes obtaining a sub-application identifier by using a parent application running in an operating system, obtaining a corresponding sub-application page configuration file according to the sub-application identifier, and obtaining a common-component identifier from the sub-application page configuration file. The method also includes selecting a common-component corresponding to the common-component identifier from a common-component library provided by the parent application, and generating a sub-application page according to the selected common-component.

Another aspect of the embodiments of this application provides an application-program processing apparatus. The apparatus includes a memory storing computer program instructions, and a processor coupled to the memory. When executing the computer program instructions, the processor is configured to perform: obtaining a sub-application identifier by using a parent application running in an operating system; obtaining a corresponding sub-application page configuration file according to the sub-application identifier; obtaining a common-component identifier from the sub-application page configuration file; selecting a common-component corresponding to the common-component identifier from a common-component library provided by the parent application; and generating a sub-application page according to the selected common-component.

Another aspect of the embodiments of this application further provides an application-program processing method used on a terminal device. The method includes obtaining a sub-application identifier by using a parent application running in an operating system of the terminal device, obtaining a corresponding sub-application page configuration file according to the sub-application identifier, and obtaining a common-component identifier from the sub-application page configuration file. The method also includes selecting a common-component corresponding to the common-component identifier from a common-component library provided by the parent application, and generating a sub-application page according to the selected common-component.

Other aspects of the present disclosure can be understood by those skilled in the art in light of the description, the claims, and the drawings of the present disclosure.

DETAILED DESCRIPTION

To make the objectives, technical solutions, and advantages of the present disclosure clearer and more comprehensible, the following further describes the present disclosure in detail with reference to the accompanying drawings. It should be understood that the specific embodiments described herein are merely used to explain the present disclosure but are not intended to limit the present disclosure.

Figure 1:
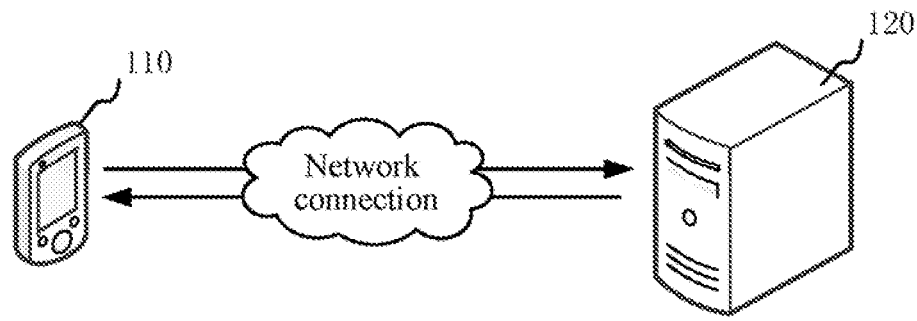
FIG. 1 is a diagram of an application environment of an application implementation system according to an embodiment of the present disclosure.

FIG. 1 is a diagram of an application environment of an application implementation system according to an embodiment of the present disclosure. Referring to FIG. 1, the application implementation system includes a terminal 110 and a server 120. The server 120 stores a sub-application page configuration file corresponding to a sub-application identifier. An operating system runs on the terminal 110, and a parent application runs under the operating system. The terminal 110 implements an application-program processing method by using the parent application, so that a sub-application page is implemented by using the parent application. The terminal 110 may specifically obtain the sub-application identifier, obtain the sub-application page configuration file corresponding to the sub-application identifier from the server 120, obtain a common-component identifier from the sub-application page configuration file, select a common-component corresponding to the common-component identifier from a common-component library provided by the parent application, and generate the sub-application page according to the selected common-component.

Figure 2:
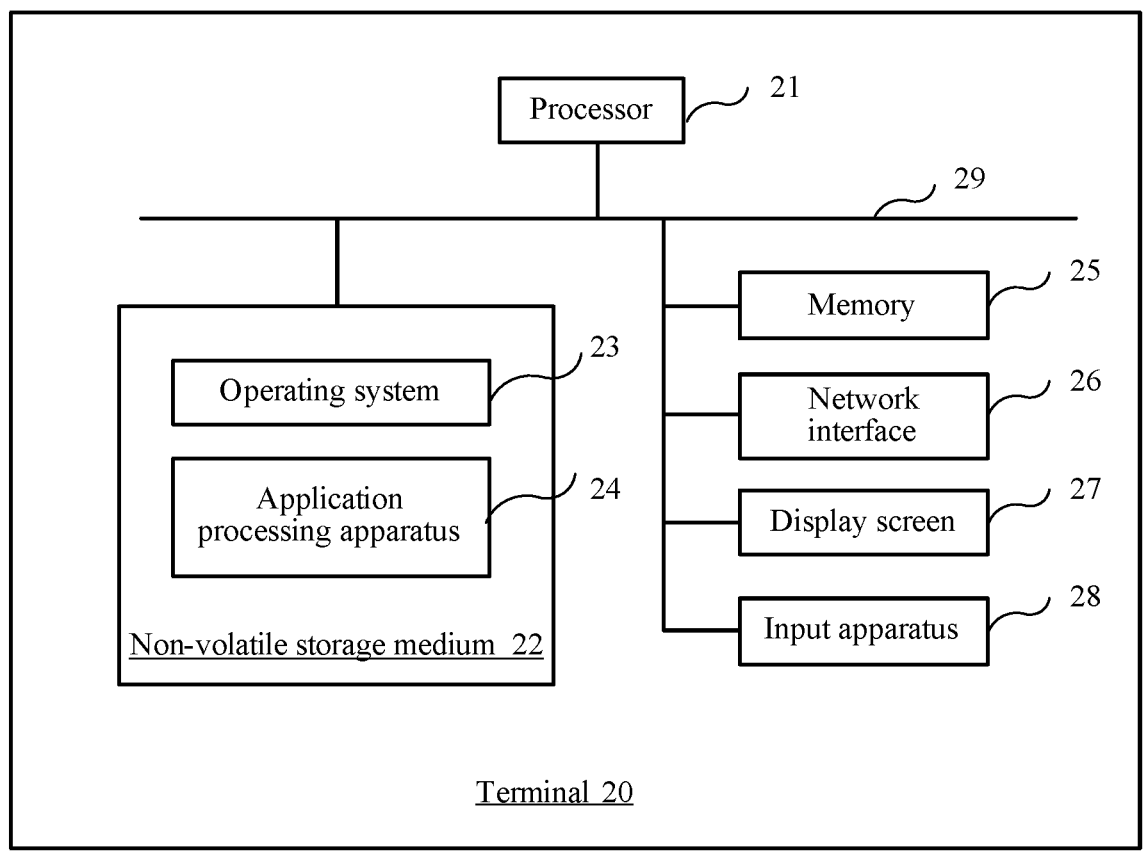
FIG. 2 is a schematic diagram of a terminal according to an embodiment of the present disclosure.

FIG. 2 is a schematic diagram of an internal structure of a terminal according to an embodiment. As shown in FIG. 2, the terminal 20 includes a processor 21, a non-volatile storage medium 22, a memory 25, a network interface 26, a display screen 27, and an input apparatus 28 that are connected by using a system bus 29.

The non-volatile storage medium 22 of the terminal 20 stores an operating system 23 and further stores an application-program processing apparatus 24. The application-program processing apparatus 24 is configured to implement an application-program processing method. The processor 21 of the terminal 20 is configured to provide a computing and control capability to support running of the entire terminal. The memory 25 of the terminal 20 provides an environment for running the application-program processing apparatus 24 in the non-volatile storage medium 22. The memory 25 may store a computer readable instruction, and the computer readable instruction, when executed by the processor 21, may cause the processor 21 to perform an application-program processing method, such as the application-program processing method shown in FIG. 3, FIG. 5, FIG. 6, and FIG. 7.

The network interface 26 of the terminal 20 is configured to perform network communications with a server, for example, download a sub-application page configuration file corresponding to a sub-application identifier. The display screen 27 of the terminal 20 may be a liquid crystal display screen, an e-ink display screen, or the like. The input apparatus 28 of the terminal 20 may be a touch layer covering the display screen 27, or may be a key, a track ball, or a touchpad disposed on a housing of the terminal, or may be an external keyboard, touchpad, or mouse.

The terminal 20 may be a personal computer or a mobile terminal, and the mobile terminal is a mobile phone, a tablet computer, a personal digital assistant, a wearable device, or the like. In the structure shown in FIG. 2, a block diagram of a partial structure related to solutions in the embodiments of the present disclosure is only shown, and does not constitute a limit to the terminal to which the solutions in the embodiments of the present disclosure are applied. Specifically, the terminal may include more components or fewer components than those shown in the FIG. 2, or some components may be combined, or a different component deployment may be used.

Figure 3:
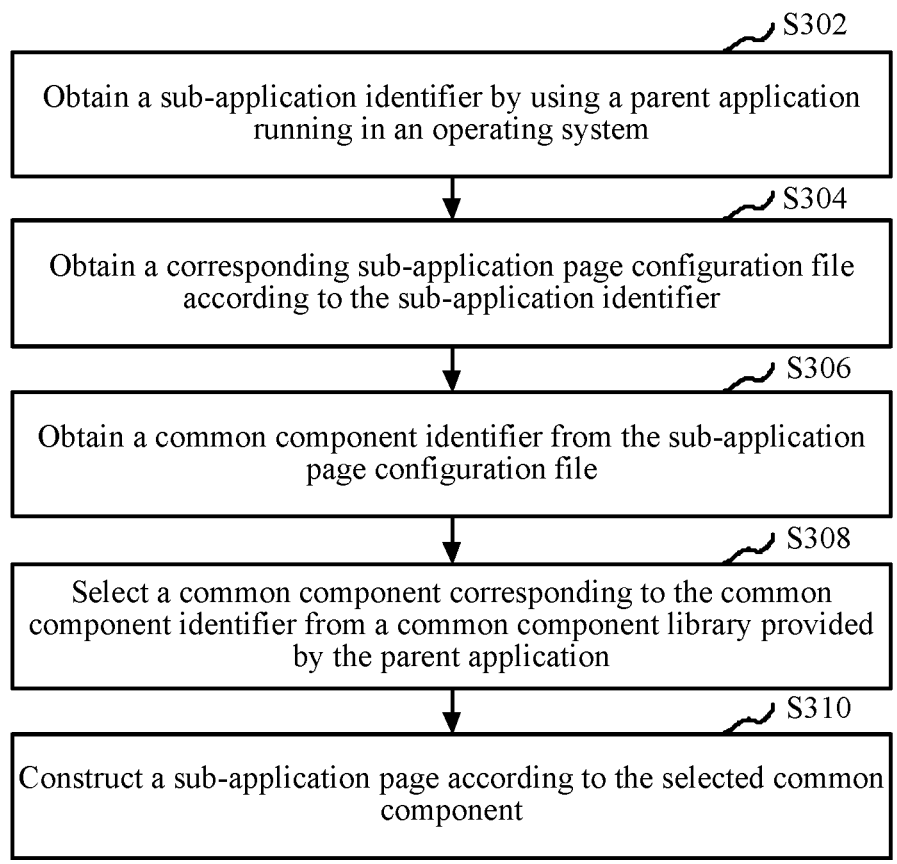
FIG. 3 is a schematic flowchart of an application-program processing method according to an embodiment of the present disclosure.

FIG. 3 is a schematic flowchart of an application-program processing method according to an embodiment of the present disclosure. The embodiment is described by using an example in which the method is applied to the terminal 110 in FIG. 1. Referring to FIG. 3, the method specifically includes the followings.

S302: Obtaining a sub-application identifier by using a parent application running in an operating system.

Figure 4:
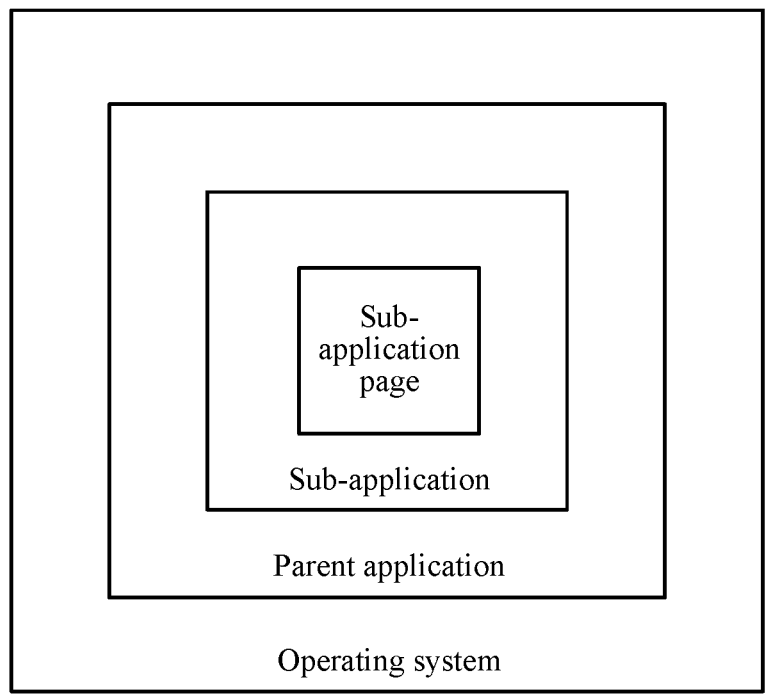
FIG. 4 is a schematic diagram of a relationship between an operating system, a parent application, a sub-application, and a sub-application page according to an embodiment of the present disclosure.

Referring to FIG. 4, the operating system runs on a terminal, and the parent application runs in the operating system. A sub-application is generated in an environment provided by the parent application, and the sub-application includes a sub-application page. The terminal may obtain the sub-application identifier locally or from the server by using the parent application.

The operating system (OS) is a computer program managing and controlling terminal hardware and software resources, and is the most basic system software directly running on a terminal bare metal. An application needs to run with supporting of the operating system.

The parent application is an application bearing one or more sub-applications, and provides an environment for implementing the sub-applications. The parent application may be a native application. The native application is an application that may directly run in the operating system. The parent application may be a social application, a dedicated application dedicatedly supporting the sub-application, a file management application, a mail application, a game application, or the like. A social application includes an instant messaging application, a social network service (SNS) application, a live broadcast application, or the like.

The sub-application is an application that may be implemented in the environment provided by the parent application, instead of the operating system. The sub-application may specifically be a social application, a file management application, a mail application, a game application, or the like.

In an embodiment, the terminal may display a sub-application list by using a parent application, receive a selection instruction for an option item in the sub-application list, and determine a selected option item in the sub-application list according to the select instruction, to obtain a sub-application identifier corresponding to the selected option item.

Further, each option item in the sub-application list represents a sub-application, and the option item may specifically be represented in a form of an image and/or text. The sub-application list may be a list of all existed sub-applications on a server, or may be a list of filtered sub-applications from the existed sub-applications on the server, or further may be a list of downloaded local sub-applications. The sub-application list may include one or more option items.

A condition for filtering the sub-applications may be a condition set by the server, or may be a condition that a user enters. The condition may be a sorting condition, a key word matching and querying condition or a pre-classification and querying condition. For example, the sorting condition is a condition of sorting in accordance with the publishing time of the sub-applications, a download quantity, a name, or the like. The keyword matching and querying condition is a condition of querying the sub-applications matching a key word entered to a terminal. The pre-classification and querying condition is a condition of querying in accordance with classifications made by the server on the sub-applications, such as a condition of querying an office class, a game class, or a social class.

S304: Obtaining a corresponding sub-application page configuration file according to the sub-application identifier.

Specifically, the terminal may obtain the sub-application page configuration file corresponding to the sub-application identifier by using the parent application locally or from the server. Further, the terminal may determine a corresponding folder according to a local sub-application identifier or a sub-application identifier on the server, to obtain the sub-application page configuration file from the folder. Alternatively, the terminal may obtain a sub-application page configuration file corresponding to the sub-application identifier according to a correspondence between the sub-application identifier and a page identifier. The page identifier is used for uniquely identifying one sub-application page included in one sub-application, and different sub-applications may use a same page identifier.

The sub-application page configuration file is a file used for configuring a page presented by the sub-application. The sub-application page configuration file may be source code or a file obtained after the source code is compiled. The page presented by the sub-application is referred to as the sub-application page, and the sub-application may include one or more sub-application pages.

In an embodiment, if the sub-application includes one sub-application page, there is only one corresponding sub-application page configuration file, and the terminal may directly obtain a sub-application page configuration file uniquely corresponding to a sub-application identifier.

Further, if the sub-application includes more than one sub-application page, the terminal may obtain a default sub-application page configuration file corresponding to the sub-application identifier, or may obtain a sub-application page configuration file corresponding to a sub-application identifier and corresponding to a specified page identifier. The specified page identifier may be specified by the server, or may be specified by the terminal according to a user operation.

S306: Obtaining a common-component identifier from the sub-application page configuration file.

Specifically, the terminal may parse the sub-application page configuration file, to obtain the common-component identifier from the sub-application page configuration file. The common-component identifier is used for uniquely identifying a corresponding common-component. The common-component is a component that is provided by the parent application and that is for different sub-applications to share, which has a visual form and is a component unit of the sub-application page. The common-component may further encapsulate logic code used for processing an event triggered for the common-component. That different sub-applications share a common-component may specifically be: calling a common-component at a same time or at different times. In an embodiment, the common-component may further be shared by the parent application and the sub-application.

S308: Selecting a common-component corresponding to the common-component identifier from a common-component library provided by the parent application.

The common-component library is a set of common-components provided by the parent application. Each common-component in the common-component library has a unique common-component identifier. The common-component library may be locally downloaded from the server when the parent application runs, or may be obtained from decompression of a corresponding application installation package when the parent application is installed.

S310: Generating a sub-application page according to the selected common-component.

Specifically, the terminal may obtain default component style data of the selected common-component, to organize and render the selected common-component with reference to the default component style data, so as to form the sub-application page. The default component style data is data for describing a default presentation form of a corresponding common-component. The default component style data may include attributes such as the location, size, color, font, and font size that are default of the corresponding common-component on the sub-application page. The terminal may specifically generate the sub-application page by browser controls integrated by the parent application and according to the selected common-component.

According to the foregoing application-program processing method, a parent application runs in an operating system, and the parent application provides a common-component library. A sub-application identifier may be obtained by using the parent application, and a corresponding sub-application page configuration file is obtained, so that a common-component is selected based on the sub-application page configuration file from the common-component library to generate a sub-application page. The sub-application identifier may identify different sub-applications and the parent application may implement the different sub-applications based on sub-application page configuration files corresponding to different sub-application identifiers. When the parent application runs, a common-component provided by the parent application may be used for quickly generating the sub-application page, thereby reducing installation duration of an application and improving use efficiency of the application.

Figure 5:
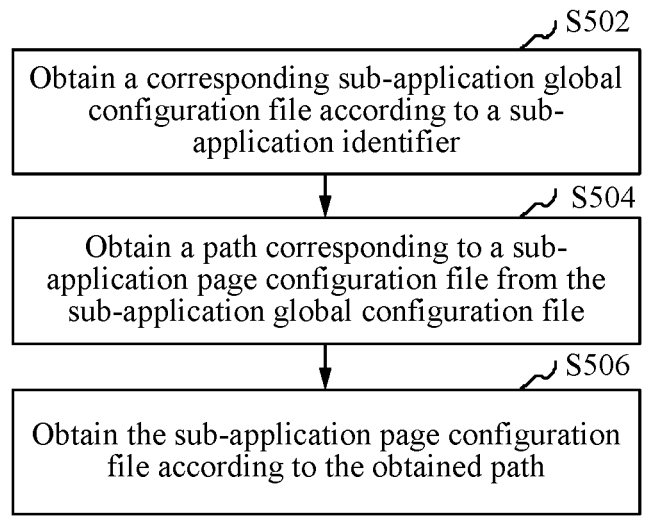
FIG. 5 is a schematic flowchart of obtaining a corresponding sub-application page configuration file according to a sub-application identifier according to an embodiment of the present disclosure.

FIG. 5 is a schematic flowchart of step S304 according to an embodiment of the present disclosure. Referring to FIG. 5, step S304 specifically includes the followings.

S502: Obtaining a corresponding sub-application global configuration file according to a sub-application identifier.

Specifically, the terminal may obtain the sub-application global configuration file corresponding to the sub-application identifier by using the parent application locally. The terminal may also send the sub-application identifier to the server by using the parent application, and receive the sub-application global configuration file that is corresponding to the sub-application identifier and that is feedback from the server. The sub-application global configuration file is a file for configuring a whole corresponding sub-application, and may specifically configure a path of a sub-application page configuration file, a window presentation form of the sub-application and a network timeout threshold of the sub-application, or other global configuration information of the sub-application.

S504: Obtaining a path corresponding to a sub-application page configuration file from the sub-application global configuration file.

Specifically, the terminal may parse the sub-application global configuration file by using the parent application, to obtain global configuration information of the sub-application, and the global configuration information of the sub-application includes the path of the sub-application page configuration file. The terminal may apply to the obtained global configuration information of the sub-application. The terminal may specifically obtain a corresponding default sub-application page configuration file from the sub-application global configuration file, and may obtain a corresponding sub-application page configuration file specified according to a user operation.

The path may specifically be on the server or a local path, and may be an absolute or a relative path. The global configuration information of the sub-application may further include a window presentation form of the sub-application and a network timeout threshold of the sub-application, and may be applied to all sub-application pages included in the corresponding sub-application.

S506: Obtaining the sub-application page configuration file according to the obtained path.

Specifically, the terminal may locate a corresponding sub-application page configuration file according to the obtained path by using the parent application, and obtain the sub-application page configuration file.

In one embodiment, a path of an application page configuration file may be obtained by using the sub-application global configuration file, and the sub-application page configuration file corresponding to the sub-application identifier is obtained, so that global configuration of the sub-application and configuration of a single sub-application page are separated, thereby facilitating global management of the sub-application and management of the single sub-application page.

In an embodiment, the application-program processing method further includes: obtaining a page style file corresponding to the sub-application page configuration file according to the sub-application identifier. Step S310 further includes: obtaining component style data corresponding to the common-component identifier from the page style file; and generating the sub-application page according to the selected common-component and the corresponding component style data.

Specifically, a corresponding page style file is existed for each sub-application page configuration file and may be obtained locally or from the server, and is used for configuring a presentation form of a corresponding sub-application page. The terminal may obtain the page style file corresponding to the sub-application page configuration file, to obtain component style data in a one-to-one correspondence with the common-component identifier, and the component style data may correspond to the common-component through a component identifier, so that when a sub-application page is generated according to the selected common-component, the component style data corresponding to the selected common-component is applied to the selected common-component.

The page style file may include the component style data corresponding to the common-component identifier, and may further include page integrity form data of the sub-application page. The component style data may include at least one of attributes such as a location, a size, a color, a font, and a font size of the corresponding common-component on the sub-application page. The page integrity form data may include at least one of attributes such as a page size of the corresponding sub-application page and a page background color.

In one embodiment, based on the page style file corresponding to the sub-application page configuration file, differentiated representation modes may be implemented for different sub-applications and different sub-application pages, so that it may be achieved that use experience of the sub-application and the native application are consistent, and the sub-application is more lightweight than the native application.

Figure 6:
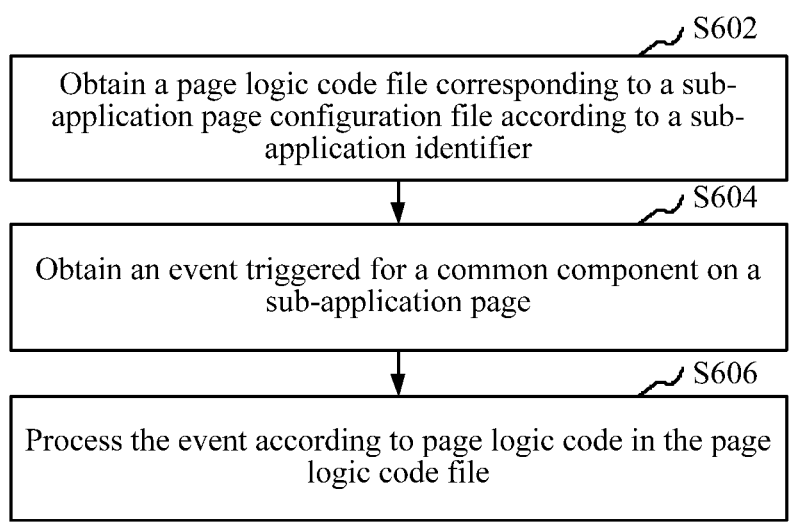
FIG. 6 is a schematic flowchart of processing an event triggered on a sub-application page according to a page logic code file corresponding to a sub-application page configuration file according to an embodiment of the present disclosure.

In an embodiment, the application-program processing method further includes processing an event triggered on a sub-application page according to a page logic code file corresponding to a sub-application page configuration file. Referring to FIG. 6, processing an event triggered on a sub-application page according to a page logic code file corresponding to a sub-application page configuration file specifically includes the followings.

S602: Obtaining a page logic code file corresponding to a sub-application page configuration file according to a sub-application identifier.

Specifically, the terminal may obtain the page logic code file locally or from the server by using the parent application, the page logic code file corresponds to the sub-application identifier, and the page logic code file may be in a one-to-one correspondence with the sub-application page configuration file. The correspondence between the sub-application page configuration file and the page logic code file may be recorded on the sub-application page configuration file and/or the page logic code file. The page logic code file records page logic code, the page logic code may be used for processing event triggered on a corresponding sub-application page, and may further be used for other logical processing including data processing. The page logic code file may be a script file, such as a JavaScript script file.

S604: Obtaining an event triggered for a common-component on a sub-application page.

Specifically, the terminal may detect or listen to the event triggered on the sub-application page for the common-component on the sub-application page by using the parent application. The event triggered for the common-component is an event triggered when the component is operated. The event is used for describing an operation generated on the sub-application page. The event may include various event types, such as a touch event, a form submit (Submit) event, an input event, or a scroll (Scroll) event. The touch event is a starting touch event, a touch mobile event, a touch cancel event, a touch end event, a touch exceeding a preset duration event, and the like.

S606: Processing the event according to page logic code in the page logic code file.

Specifically, after obtaining the event by using the parent application, a terminal may determine an event type of the event, so that page logic code matching the event type and in the page logic code file is used to process the event. The event may carry a corresponding common-component identifier, and the terminal may use page logic code corresponding to the common-component identifier and corresponding to the event type of the event in the page logic code file to process the event, to obtain a corresponding event processing result. The event may further carry data, and the terminal may transmit the data carried by the event to the page logic code for processing when processing the event by using the parent application. In an embodiment, the terminal may further update the sub-application page or switch the sub-application page by using the parent application and according to the event processing result corresponding to the event.

In one embodiment, the sub-application page configuration file has a corresponding page logic code file, presentation and logical interaction of the sub-application page are separated, and the sub-application page configuration file and the page logic code file may be separately updated and used. This is more applicable to implementation and maintenance of the sub-application.

In an embodiment, step S606 includes: calling, according to page logic code in the page logic code file, an application programming interface provided by the parent application to process the event.

Specifically, the parent application provides an application programming interface base, and the application programming interface base includes rich application programming interfaces (API). The terminal may select, by using the parent application and according to the page logic code in the page logic code file, an application programming interface required for processing the event and in the application programming interface base, so that the event is processed by using the selected application programming interface, to obtain an event response result. The application programming interface may be configured to perform a network operation, data processing, a media operation, a terminal hardware operation, a sub-application page operation, or the like. The page logic code in the page logic code file may record a correspondence between the event type and the application programming interface, or a correspondence between the event type, the common-component identifier and the application programming interface, so that an application programming interface required for processing an event and in the application programming interface base may be selected according to the correspondence recorded by the page logic code in the page logic code file.

In one embodiment, it is implemented that the event triggered on the sub-application page is processed by using the application programming interface provided by the parent application, and the page logic code in the page logic code file is used for configuring to call the application programming interface provided by the parent application, so that an implementation of the sub-application is more lightweight.

In an embodiment, step S606 includes: calling, according to page logic code in the page logic code file, an application programming interface provided by an operating system to process an event. In one embodiment, the application programming interface provided by the operating system is directly called by using the parent application to process the event, so that an implementation of the sub-application is more lightweight.

In an embodiment, step S606 includes: calling, according to page logic code in the page logic code file, an application programming interface provided by a parent application, and calling, by using the application programming interface provided by the parent application, an application programming interface provided by an operating system to process the event.

Specifically, the application programming interface provided by the parent application may be encapsulation of the application programming interface provided by the operating system, and one application programming interface provided by the parent application may be encapsulation of one or more application programming interfaces provided by the operating system. The terminal calls, by using the parent application, the application programming interface provided by the parent application, to call the application programming interface provided by the operating system, and transfers the event to the operating system for processing, to obtain a corresponding event response result.

In one embodiment, the parent application processes the event triggered on the sub-application page by using the application programming interface provided by the operating system. Compared with totally processing the event by the parent application, this can reduce a burden of the parent application.

Figure 7:
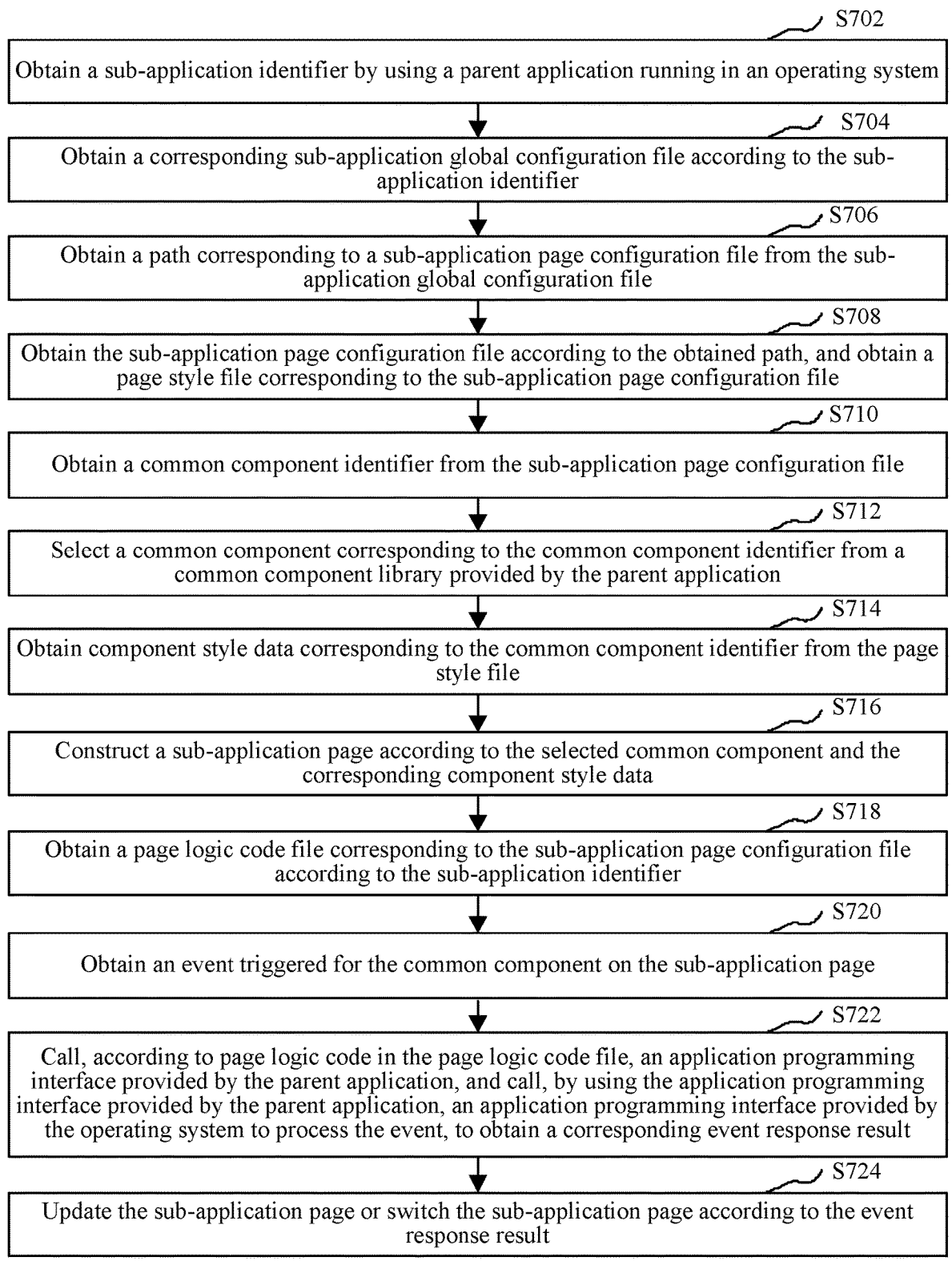
FIG. 7 is a schematic flowchart of an application-program processing method according to another embodiment of the present disclosure.

FIG. 7 is a schematic flowchart of an application-program processing method according to another embodiment. Referring to FIG. 7, the application-program processing method specifically includes the followings.

S702: Obtaining a sub-application identifier by using a parent application running in an operating system.

S704: Obtaining a corresponding sub-application global configuration file according to the sub-application identifier.

S706: Obtaining a path corresponding to a sub-application page configuration file from the sub-application global configuration file.

S708: Obtaining the sub-application page configuration file according to the obtained path, and obtaining a page style file corresponding to the sub-application page configuration file.

S710: Obtaining a common-component identifier from the sub-application page configuration file.

S712: Selecting a common-component corresponding to the common-component identifier from a common-component library provided by the parent application.

S714: Obtaining component style data corresponding to the common-component identifier from the page style file.

S716: Generating a sub-application page according to the selected common-component and the corresponding component style data.

S718: Obtaining a page logic code file corresponding to the sub-application page configuration file according to the sub-application identifier.

S720: Obtaining an event triggered for the common-component on the sub-application page.

S722: Calling, according to page logic code in the page logic code file, an application programming interface provided by the parent application, and call, by using the application programming interface provided by the parent application, an application programming interface provided by the operating system to process the event, to obtain a corresponding event response result.

S724: Updating the sub-application page or switch the sub-application page according to the event response result.

According to the foregoing application-program processing method, the sub-application identifier may identify different sub-applications, and the parent application may implement different sub-applications based on sub-application page configuration files corresponding to different sub-application identifiers. When the parent application runs, a common-component provided by the parent application may be used for quickly generating the sub-application page, thereby reducing installation duration of an application. This is more lightweight than a native application and use efficiency of the application is improved. Configuration of the global sub-application and configuration of a single sub-application page are separated, thereby facilitating management of the global sub-application and management of the single sub-application page.

Figure 8:
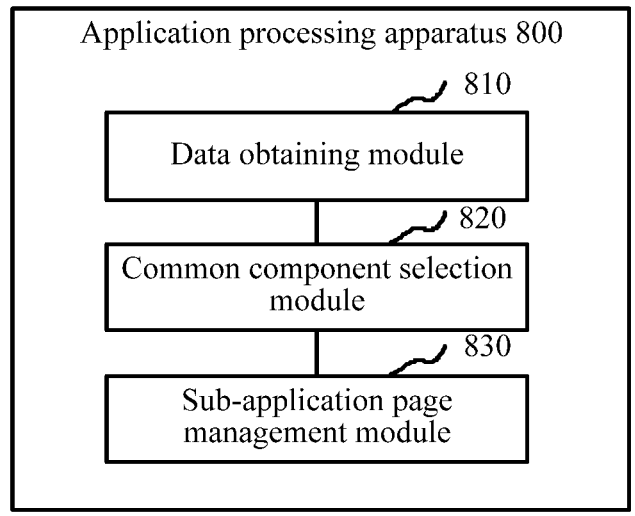
FIG. 8 is a structural block diagram of an application-program processing apparatus according to an embodiment of the present disclosure.

FIG. 8 is a structural block diagram of an application-program processing apparatus 800 according to an embodiment. Referring to FIG. 8, the application-program processing apparatus 800 includes: a data obtaining module 810, a common-component selection module 820 and a sub-application page management module 830.

The data obtaining module 810 is configured to: obtain a sub-application identifier by using a parent application running in an operating system, obtain a corresponding sub-application page configuration file according to the sub-application identifier, and obtain a common-component identifier from the sub-application page configuration file.

The common-component selection module 820 is configured to select a common-component corresponding to the common-component identifier from a common-component library provided by the parent application.

The sub-application page management module 830 is configured to generate a sub-application page according to the selected common-component.

According to the foregoing application-program processing apparatus 800, a parent application runs in an operating system, and the parent application provides a common-component library. A sub-application identifier may be obtained by using the parent application, and a corresponding sub-application page configuration file is obtained, so that a common-component is selected based on the sub-application page configuration file from the common-component library to generate a sub-application page. The sub-application identifier may identify different sub-applications, and the parent application may implement the different sub-applications based on sub-application page configuration files corresponding to different sub-application identifiers. When the parent application runs, a common-component provided by the parent application may be used for quickly generating the sub-application page, thereby reducing installation duration of an application and improving use efficiency of the application.

In an embodiment, the data obtaining module 810 is further configured to: obtain a corresponding sub-application global configuration file according to a sub-application identifier, obtain a path corresponding to a sub-application page configuration file from the sub-application global configuration file, and obtain the sub-application page configuration file according to the obtained path.

A path of an application page configuration file may be obtained by using the sub-application global configuration file, and the sub-application page configuration file corresponding to the sub-application identifier is obtained, so that global configuration of the sub-application and configuration of a single sub-application page are separated, thereby facilitating global management of the sub-application and management of the single sub-application page.

In an embodiment, the data obtaining module 810 is further configured to obtain a page style file corresponding to a sub-application page configuration file according to a sub-application identifier.

The sub-application page management module 830 is further configured to obtain component style data corresponding to the common-component identifier from a page style file, and generate a sub-application page according to the selected common-component and the corresponding component style data.

Based on the page style file corresponding to the sub-application page configuration file, differentiated representation modes may be implemented for different sub-applications and different sub-application pages, so that it may be achieved that use experience of the sub-application and the native application are basically consistent, and the sub-application is more lightweight than the native application.

In an embodiment, the data obtaining module 810 is further configured to obtain a page logic code file corresponding to a sub-application page configuration file according to a sub-application identifier.

The sub-application page management module 830 is further configured to obtain an event triggered for a common-component on a sub-application page.

Figure 9:
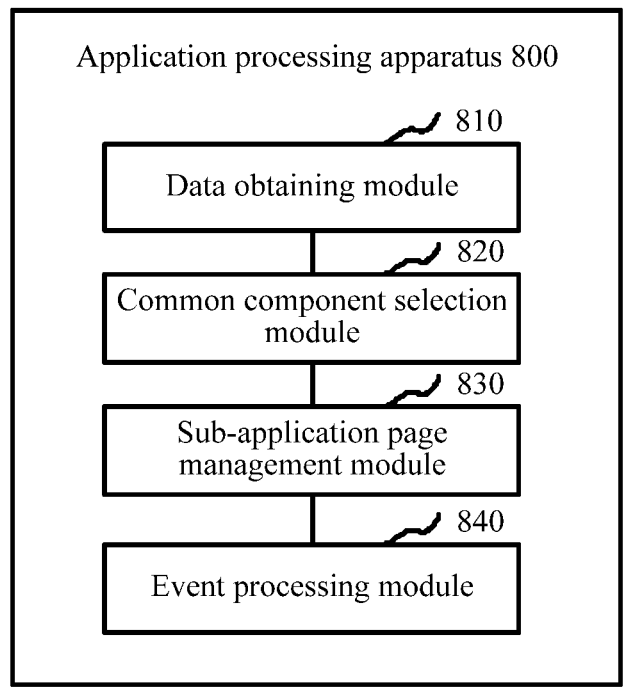
FIG. 9 is a structural block diagram of an application-program processing apparatus according to another embodiment of the present disclosure.

As shown in FIG. 9, the application-program processing apparatus 800 further includes: an event processing module 840, configured to process an event according to page logic code in a page logic code file.

The sub-application page configuration file has a corresponding page logic code file, presentation and logical interaction of the sub-application page are separated, and the sub-application page configuration file and the page logic code file may be separately updated and used. This is more applicable to implementation and maintenance of the sub-application.

In an embodiment, the event processing module 840 is further configured to call, according to the page logic code in the page logic code file, an application programming interface provided by a parent application to process an event, or call, according to the page logic code in the page logic code file, an application programming interface provided by an operating system to process an event.

In one embodiment, it is implemented that the event triggered on the sub-application page is processed by using the application programming interface provided by the parent application, and the page logic code in the page logic code file is used for configuring to call the application programming interface provided by the parent application, so that an implementation of the sub-application is more lightweight. The application programming interface provided by the operating system is directly called by using the parent application to process the event, so that an implementation of the sub-application is more lightweight.

In an embodiment, the event processing module 840 is further configured to call, according to the page logic code in the page logic code file, an application programming interface provided by a parent application, and call, by using the application programming interface provided by the parent application, an application programming interface provided by an operating system to process the event.

In one embodiment, the parent application processes the event triggered on the sub-application page by using the application programming interface provided by the operating system. Compared with totally processing the event by the parent application, this can reduce a burden of the parent application.

All or some of the procedures of the methods of the foregoing embodiments may be implemented by a computer program instructing relevant hardware. The program may be stored in a non-volatile computer readable storage medium. When the program is executed, the program may include the procedures of the embodiments of the foregoing methods. The storage medium may be a magnetic disk, an optical disc, a read-only memory (ROM), or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall all fall within the protection scope of the present disclosure. Therefore, the protection scope of the patent of the present disclosure shall be subject to the appended claims.

What is claimed is:

1. An application-program processing method, comprising:

displaying a sub-application list via a parent application running in an operating system of a terminal, the sub-application list including a first sub-application and a second sub-application different than the first sub-application, the first sub-application corresponding to a first common-component identifier, and the second sub-application corresponding to a second common-component identifier;

selecting a common-component shared by the first and the second common-component identifiers from a common-component library provided by the parent application, wherein the common-component library as provided by the parent application correlates common-components with respective common-component identifiers; and generating a sub-application page of the first or the second sub-application according to the common-component as selected in an environment provided by the parent application, instead of the operating system.

2. The method of claim 1, wherein the first common-component identifier of the first sub-application is obtained via:

obtaining a first sub-application identifier via the parent application running in the operating system of the terminal;

obtaining a first sub-application page configuration file according to the first sub-application identifier; and obtaining the first common-component identifier according to the first sub-application page configuration file.

3. The method of claim 2, wherein the first sub-application page configuration file is obtained via:

locating a folder at the terminal or from a server according to the first sub-application identifier; and obtaining the first sub-application page configuration file from the folder.

4. The method of claim 2, wherein the first sub-application page configuration file is obtained via:

obtaining the first sub-application page figuration file according to a correspondence between sub-application identifiers and respective page identifiers, the first sub-application page figuration file corresponding a first page identifier in the correspondence, wherein the first page identifier identifies the sub-application page of the first or the second sub-application.

5. The method of claim 1, wherein the first common-component identifier is obtained via:

parsing the first sub-application page configuration file to obtain the first common-component identifier from the sub-application page configuration file.

6. The method of claim 1, further comprising:

processing by the parent application an event triggered on the sub-application page using an encapsulation of an applicant programming interface provided by the operating system.

7. The method of claim 1, further comprising:

detecting, using the parent application, an event triggered on the sub-application page for the common component, wherein the event triggered for the common-component is an event triggered in response to the common-component being operated, and wherein the event includes a touch event, a form submit event, an input event, or a scroll event.

8. The method of claim 1, wherein the parent application includes a social application, an instant messaging application, a social network service application, a live broadcast application, or a game application.

9. An application-program processing apparatus, comprising: a memory; and a processor coupled to the memory, the processor being configured to perform:

displaying a sub-application list via a parent application running in an operating system of a terminal, the sub-application list including a first sub-application and a second sub-application different than the first sub-application, the first sub-application corresponding to a first common-component identifier, and the second sub-application corresponding to a second common-component identifier;

selecting a common-component shared by the first and the second common-component identifiers from a common-component library provided by the parent application, wherein the common-component library as provided by the parent application correlates common-components with respective common-component identifiers; and generating a sub-application page of the first or the second sub-application according to the common-component as selected in an environment provided by the parent application, instead of the operating system.

10. The apparatus of claim 9, wherein the first common-component identifier of the first sub-application is obtained via:

obtaining a first sub-application identifier via the parent application running in the operating system of the terminal;

obtaining a first sub-application page configuration file according to the first sub-application identifier; and obtaining the first common-component identifier according to the first sub-application page configuration file.

11. The apparatus of claim 10, wherein the first sub-application page configuration file is obtained via:

locating a folder at the terminal or from a server according to the first sub-application identifier; and obtaining the first sub-application page configuration file from the folder.

12. The apparatus of claim 10, wherein the first sub-application page configuration file is obtained via:

obtaining the first sub-application page figuration file according to a correspondence between sub-application identifiers and respective page identifiers, the first sub-application page figuration file corresponding a first page identifier in the correspondence, wherein the first page identifier identifies the sub-application page of the first or the second sub-application.

13. The apparatus of claim 9, wherein the first common-component identifier is obtained via:

parsing the first sub-application page configuration file to obtain the first common-component identifier from the sub-application page configuration file.

14. The apparatus of claim 9, wherein the processor is further configured to perform:

processing by the parent application an event triggered on the sub-application page using an encapsulation of an applicant programming interface provided by the operating system.

15. The apparatus of claim 9, wherein the processor is further configured to perform:

detecting, using the parent application, an event triggered on the sub-application page for the common component, wherein the event triggered for the common-component is an event triggered in response to the common-component being operated, and wherein the event includes a touch event, a form submit event, an input event, or a scroll event.

16. A non-transitory computer-readable storage medium storing computer program instructions executable by a processor to perform:

displaying a sub-application list via a parent application running in an operating system of a terminal, the sub-application list including a first sub-application and a second sub-application different than the first sub-application, the first sub-application corresponding to a first common-component identifier, and the second sub-application corresponding to a second common-component identifier;

selecting a common-component shared by the first and the second common-component identifiers from a common-component library provided by the parent application, wherein the common-component library as provided by the parent application correlates common-components with respective common-component identifiers; and generating a sub-application page of the first or the second sub-application according to the common-component as selected in an environment provided by the parent application, instead of the operating system.

17. The non-transitory computer-readable storage medium of claim 16, wherein the first common-component identifier of the first sub-application is obtained via:

obtaining a first sub-application identifier via the parent application running in the operating system of the terminal;

obtaining a first sub-application page configuration file according to the first sub-application identifier; and obtaining the first common-component identifier according to the first sub-application page configuration file.

18. The non-transitory computer-readable storage medium of claim 17, wherein the first sub-application page configuration file is obtained via:

locating a folder at the terminal or from a server according to the first sub-application identifier; and obtaining the first sub-application page configuration file from the folder.

19. The non-transitory computer-readable storage medium of claim 17, wherein the first sub-application page configuration file is obtained via:

obtaining the first sub-application page figuration file according to a correspondence between sub-application identifiers and respective page identifiers, the first sub-application page figuration file corresponding a first page identifier in the correspondence, wherein the first page identifier identifies the sub-application page of the first or the second sub-application.

20. The non-transitory computer-readable storage medium of claim 16, wherein the computer program instructions are executable by the processor to further perform:

processing by the parent application an event triggered on the sub-application page using an encapsulation of an applicant programming interface provided by the operating system.

* * * * *